United States Patent
Avitbul (10) Patent No.: US 12,542,779 B1
(45) Date of Patent: Feb. 3, 2026

(54) SECURE AND DYNAMIC PEER-BASED NETWORK CONNECTION CONFIGURATION, ROUTING, AND CONTROL

(71) Applicant: ORB Spring Ltd., Tel Aviv (IL)

(72) Inventor: Barak Avitbul, Tel Aviv (IL)

(73) Assignee: ORB Spring Ltd., Tel Aviv (IL)

( * ) Notice: Subject to any disclaimer, the term of this patent is extended or adjusted under 35 U.S.C. 154(b) by 0 days.

(21) Appl. No.: 19/086,583

(22) Filed: Mar. 21, 2025

(51) Int. Cl.
*H04L 9/40* (2022.01)

(52) U.S. Cl.
CPC ...... *H04L 63/0876* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,294,558 B1 * | 3/2016 | Vincent | ............... | H04L 67/1006 |
| 11,514,079 B1 * | 11/2022 | Gouws | ................... | G06F 21/44 |
| 2003/0208621 A1 * | 11/2003 | Bowman | ............... | H04L 67/563 |
| | | | | 709/202 |
| 2013/0007442 A1 * | 1/2013 | Mao | ...................... | H04L 9/3247 |
| | | | | 713/156 |
| 2018/0337771 A1 * | 11/2018 | Baker | .................... | H04L 9/3236 |
| 2018/0367608 A1 * | 12/2018 | Miyaki | ................. | H04L 67/141 |
| 2020/0327100 A1 * | 10/2020 | Androulaki | ........... | H04L 9/0643 |
| 2023/0139509 A1 * | 5/2023 | Landman | ............ | H04L 67/1097 |
| | | | | 717/168 |
| 2025/0094519 A1 * | 3/2025 | Kol | ......................... | H04L 67/59 |

* cited by examiner

*Primary Examiner* — Joseph P Hirl
*Assistant Examiner* — Hassan Saadoun
(74) *Attorney, Agent, or Firm* — Finnegan, Henderson, Farabow, Garrett & Dunner, LLP (57) ABSTRACT

Disclosed herein are techniques for dynamically establishing a peer network connectivity. Techniques include method that includes establishing an initial connection with a client device; receiving, from the client device and across the initial connection, a peer-connection request including at least one peer node parameter; determining, from among peer nodes, a subset of the peer nodes satisfying the at least one peer node parameter; and transmitting, to the subset of peer nodes, connection generation communications to trigger establishment of respective client-peer connections between a plurality of recipient peer nodes and the client device, the connection generation communications each comprising client device connection information for establishing the respective client-peer connection.

20 Claims, 3 Drawing Sheets

SECURE AND DYNAMIC PEER-BASED NETWORK CONNECTION CONFIGURATION, ROUTING, AND CONTROL

TECHNICAL FIELD

The subject matter described herein generally relates to techniques for improving networking in peer-based computer environments. Such techniques may be applied to wide area networks. For example, certain disclosed embodiments are directed to managing connections among peers to handle requests from clients for remote information.

BACKGROUND

In current networking environments, client devices frequently need to be able to quickly and reliably access or download information from remote sources, such as information related to a website. While this information is sometimes processed through peer devices, it is not always done so in a reliably fast manner or according to the specific needs of a requesting client device. Moreover, even in networks where peers are used, they are often assigned in a static manner to a source and/or destination, which fails to respond to needs of client devices or appreciate rapid changes occurring in pools of available peers. Additionally, entities managing connections also frequently handle payload content data as well, creating network congestion and limiting the speed at which connections are established and terminated, and at which requested data can be retrieved.

In view of the technical deficiencies of current systems, there are needs for improved networking in peer-based computer environments. The techniques discussed below address these deficiencies. For example, the techniques offer solutions that provide fast, scalable, and efficient connection control while maintaining security and respecting constraints of particular client devices or systems.

SUMMARY

Some disclosed embodiments describe non-transitory computer-readable media, systems, and methods for dynamically establishing peer network connectivity. For example, in an exemplary embodiment, a method may include establishing an initial connection with a client device; receiving, from the client device and across the initial connection, a peer-connection request including at least one peer node parameter; determining, from among peer nodes, a subset of the peer nodes satisfying the at least one peer node parameter; and transmitting, to the subset of peer nodes, a connection generation communication to trigger establishment of a client-peer connection between a recipient peer node and the client device, the connection generation communication including client device connection information for establishing the client-peer connection.

In accordance with further embodiments, when the peer-connection request is received, the client device lacks information identifying the subset of peer nodes; and the peer-connection request is received without peer connection information.

In accordance with further embodiments, the method further includes receiving connection availability information repeatedly from at least some of the peer nodes; and generating or updating a connection information map of the peer nodes based on the connection availability information.

In accordance with further embodiments, the peer nodes include at least thousands of peer nodes; and the connection availability information is determined in association with the peer-connection request, the subset of peer nodes, and the connection generation communication.

In accordance with further embodiments, the peer-connection request is configured by the client device using a software library.

In accordance with further embodiments, the at least one peer node parameter is set by the client device using the software library.

In accordance with further embodiments, the client device lacks information identifying the subset of peer nodes when the peer-connection request is configured.

In accordance with further embodiments, the peer-connection request is triggered by an access intention action initiated by the client device; and the access intention action includes an indication of intent to access endpoint data.

In accordance with further embodiments, the subset of peer nodes establish at least one peer-target connection with a target data source having access to the endpoint data.

In accordance with further embodiments, the subset of peer nodes receive the endpoint data from the target data source across the at least one peer-target connection.

In accordance with further embodiments, the client device receives the endpoint data from the subset of peer nodes across the client-peer connection after the subset of peer nodes receives the endpoint data from a target data source.

In accordance with further embodiments, the at least one peer node parameter includes at least one of: a port number, a geographical area, a device type, an operating system (OS), a number of peers, a connection timeframe, or a bandwidth.

In accordance with further embodiments, determining the subset of peer nodes includes determining a subgroup of peer nodes satisfying the at least one peer node parameter; and after determining the subgroup, determining, from among the subgroup of peer nodes, the subset of peer nodes based on at least one performance parameter set by a connection management device.

In accordance with further embodiments, the connection generation communication includes a time to live (TTL) for the client-peer connection; and the TTL for the client-peer connection is based on the at least one peer node parameter.

In accordance with further embodiments, the method further includes associating an IP address of the client device with identification information uniquely identifying a client entity.

In accordance with further embodiments, the method further includes tracking network traffic between subset of peer nodes and the client device.

In accordance with further embodiments, tracking the network traffic between subset of peer nodes and the client device includes receiving network traffic information from the subset of peer nodes.

In accordance with further embodiments, tracking the network traffic between subset of peer nodes and the client device includes receiving network traffic information from the client device.

In accordance with further embodiments, the client device connection information includes a security key usable by one of the subset of peer nodes to authenticate itself to the client device.

Further disclosed embodiments include a non-transitory computer-readable medium which may include instructions that, when executed by at least one processor, cause the at least one processor to perform operations for dynamically establishing a peer network connectivity. The operations may include establishing an initial connection with a client device; receiving, from the client device and across the initial connection, a peer-connection request including at least one peer node parameter; determining, from among peer nodes, a subset of peer nodes satisfying the at least one peer node parameter; and transmitting, from a connection to the subset of peer nodes, a connection generation communication to trigger establishment of a client-peer connection with the client device, the connection generation communication comprising client device connection information for establishing the client-peer connection.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
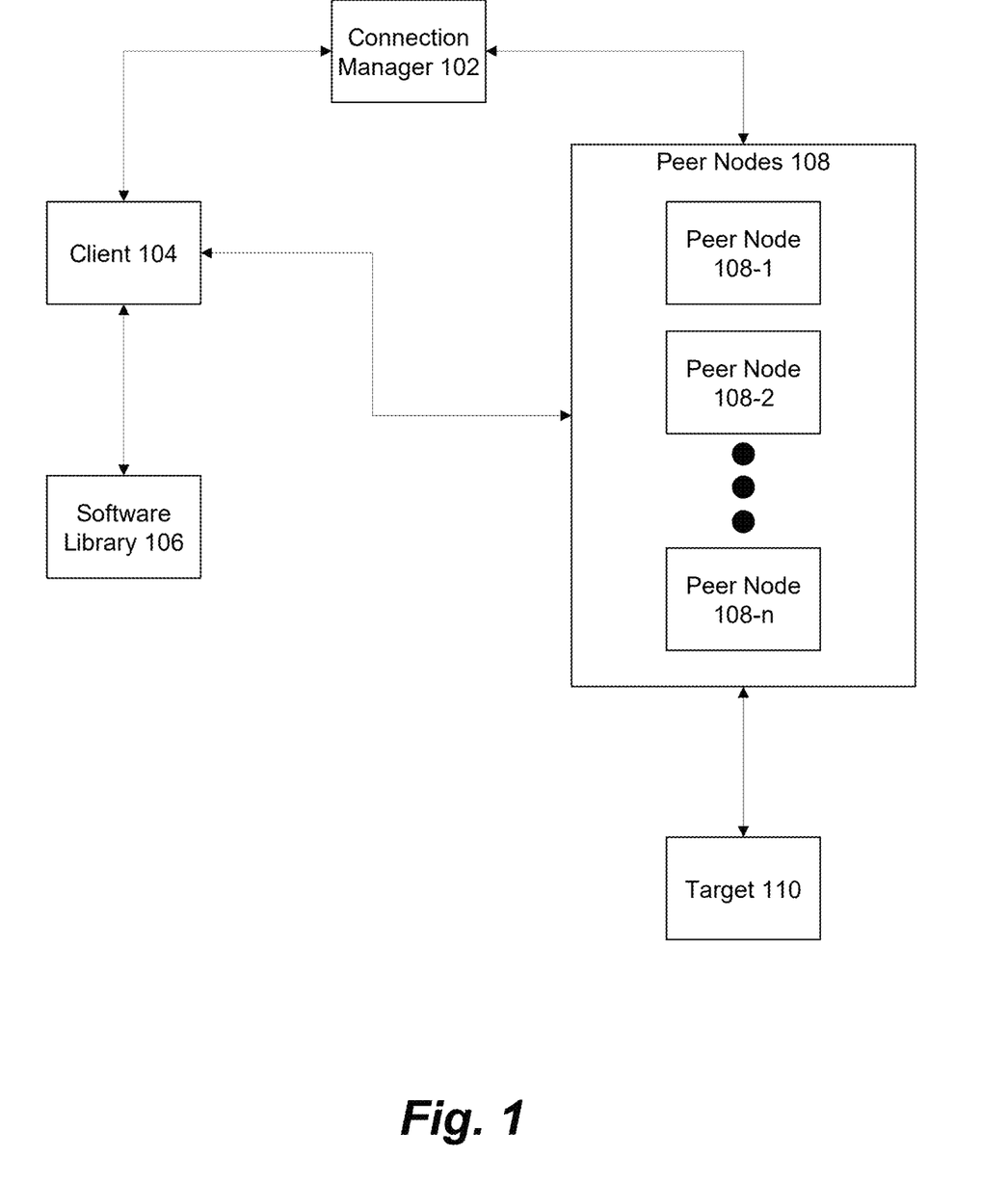
FIG. 1 illustrates an exemplary pictographic representation of a peer-based network architecture, consistent with embodiments of the present disclosure.

FIG. 1 illustrates an exemplary pictographic representation of a peer-based network architecture 100. Network architecture 100 may include a connection manager 102, which may be one or more processing devices (e.g., at least one computing device 200) configured to perform operations to establish connections with and/or between other devices. Connection manager 102 may include, for example, at least one or a server, a cloud device, a system of multiple computing devices, a general-purpose processor, a special-purpose processor, or any combination thereof.

Figure 3:
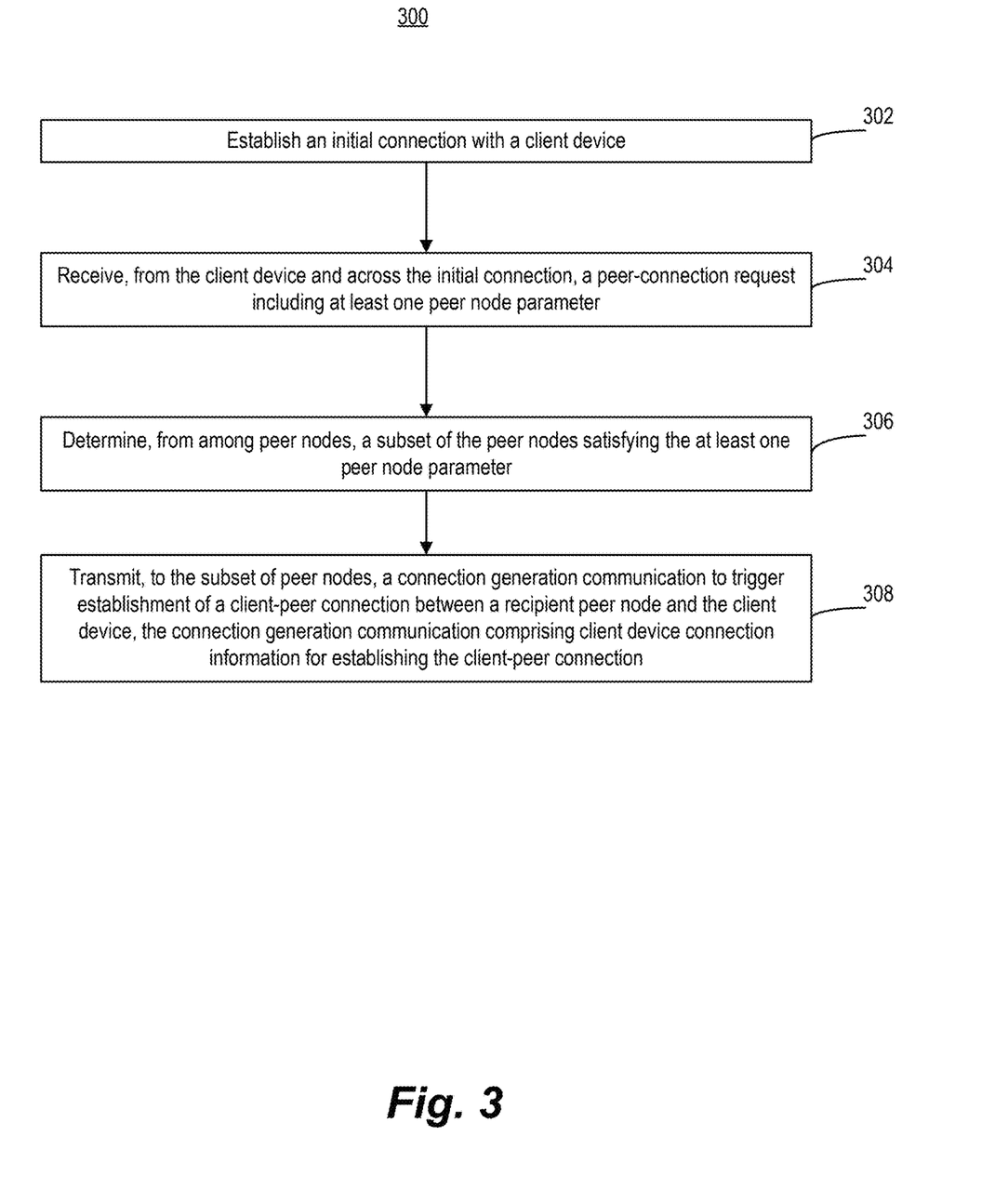
FIG. 3 depicts a flowchart of an exemplary process for dynamically establishing peer network connectivity, consistent with embodiments of the present disclosure.

In some embodiments, connection manager 102 may be configured to perform a method (e.g., operations) to dynamically establish peer network connectivity, consistent with disclosed embodiments. For example, connection manager 102 may be configured to perform process 300. By way of further example, connection manager 102 may include a non-transitory computer-readable medium storing one or more instructions that, when executed by one or more processors (which may also be part of connection manager 102), cause the one or more processors to execute operations corresponding to process 300.

Network architecture 100 may also include a client 104, which may include at least one computing device 200. For example, client 104 may include a smartphone, a tablet, a desktop computer, a gaming console, a vehicle computer, a laptop, a controller, a router, or any electronic device configured to receive and/or send electrical signals across a network. In some embodiments, client 104 may connect to connection manager 102 across a wired and/or wireless connection. Client 104 may also connect to connection manager 102 across local area network (LAN) and/or wide area network (WAN), such as the Internet.

In some embodiments, client 104 may include and/or connect to a software library 106, which may store information usable to accomplish the techniques described herein. Software library 106 may include a program, application, data structure, service, module, a device or system storing or processing any of the forgoing, or any combination thereof. Software library 106 may be configured to enable connections between devices, such as between client 104 and connection manager 102 and/or between client 104 and peer nodes 108. For example, software library 106 may store connection information usable by connection manager 102 to determine how to establish connections between client 104 and peer nodes 108 and/or usable by client 104 to determine content for digital communications with connection manager 102 and/or with peer nodes 108, consistent with disclosed embodiments. In some embodiments, software library 106 may be stored entirely at client 104, may be stored entirely at one or more devices separate from client 104 (but to which client 104 may connect), or may be stored partially at client 104 and partially at the one or more separate devices. In some embodiments, client 104 and/or software library 106 may include a cloud computing component and/or virtual computing instance, such as a container or virtual machine (VM). Software library 106 may be influenced or configured by connection manager 102, client 104, or a combination of both. For example, a first portion of software library 106 related to (e.g., defining, controlling, influencing) client constraints or parameters for peer connections (e.g., a peer node parameter) may be configurable by client 104 and second portion of software library 106 related to (e.g., defining, controlling, influencing) operations for tracking information transmitted between client 104 and other devices (e.g., connection manager 102 and/or at least one peer node) may be configurable by (e.g., only by) connection manager 102.

In some embodiments, client 104 may be configured to perform a method (e.g., operations executable by at least one processor and/or executable according to instructions stored on a non-transitory computer-readable medium) to connect with connection manager 102 and/or one or more peer nodes, consistent with disclosed embodiments. For example, client 104 may be configured to connect (e.g., as a first step) with connection manager 102 and transmit a peer-connection request including at least one peer node parameter, consistent with disclosed embodiments. After or based on transmitting the peer-connection request, client 104 may receive (e.g., as a second step) connection requests from one or more peer nodes and may establish one or more client-peer connections with at least a portion of the one or more peer nodes from which it received connection requests. After or based on establishing one or more client-peer connections, client 104 may receive (e.g., as third step) endpoint data from the at least a portion of the one or more peer nodes (e.g., across the one or more peer-connections), consistent with disclosed embodiments. Client 104 may be configured to receive, access, determine, store, and/or use (e.g., for constructing peer-connection request, for authenticating connection requests from one or more peer nodes, and/or for accepting connection requests from one or more peer nodes) at least one configuration setting, such as a peer node parameter, which may be based on a user interaction detected at client 104. A configuration setting may be stored at software library 106.

Network architecture 100 may also include peer nodes 108, such as peer node 108-1 and peer node 108-2, through peer node 108-n. In other words, any number of peer nodes may exist within peer nodes 108, such as a single peer node, two peer nodes, dozens of peer nodes, hundreds of peer nodes, thousands of peer nodes, tens of thousands of peer nodes, or millions of peer nodes. While peer nodes 108 are shown as part of a singular box in FIG. 1, it is appreciated that peer nodes 108 may exist within one or more networks. For example, peer nodes 108 may exist within multiple disparate LANs and/or WANs, or the like. As another example, peer nodes 108 may exist within multiple disparate LANs within the same WAN. In some embodiments, some amount of peer nodes 108 (including all of peer nodes 108) may exist within a same LAN. Alternatively, each node of peer nodes 108 may exist in a separate LAN.

A peer node of peer nodes 108 may include a computing and/or networking resource. For example, a peer node may include at least one computing device 200. Additionally or alternatively, a peer node may include at least one server, at least one processor, at least one database, at least one router, at least one switch, at least one personal computing device, or the like. In some embodiments, a peer node may include another client (e.g., distinct or separate from client 104) and/or may be configured to perform some or all of the same functions as client 104. A peer node may be configured to connect to any combination of client 104, connection manager 102, one or more other peer nodes, or target 110.

Network architecture 100 may also include target 110. Target 110 may include one or more data storage devices or systems, such as a database, a server (e.g., web server, cloud server, etc.), an application, a virtualized cloud instance, IoT device, or other types of network-accessible locations. Target 110 may be located remotely from (e.g., across a WAN, such as the Internet) client 104 and/or connection manager 102. In some embodiments, target 110 may be part of a distributed cloud computing content delivery network. Target 110 may store and/or be configured to provide access to endpoint data, consistent with disclosed embodiments. In some embodiments, endpoint data may be distributed across multiple targets 110.

The connections between entities of network architecture 100, depicted by the double-headed arrows, may be communication channels, which may include a bus, a cable, a wireless (e.g., over-the-air) communication channel, a radio-based communication channel, a local area network (LAN), the Internet, a wireless local area network (WLAN), a wide area network (WAN), a cellular communication network, or any Internet Protocol (IP) based communication network, and the like. These connections may be of the same type or of different types, and may include combinations of types (e.g., the Internet and a LAN). Moreover, while not depicted in FIG. 1, there may be additional intermediary entities along these connections between the entities depicted in the FIG. 1. Any or all of these connections may be or include a secure, encrypted, virtual communication pathway, such as a tunnel.

Any combination of components of network architecture 100 may perform any number of steps (e.g., blocks) of the exemplary processes discussed herein, consistent with the disclosed exemplary embodiments.

Figure 2:
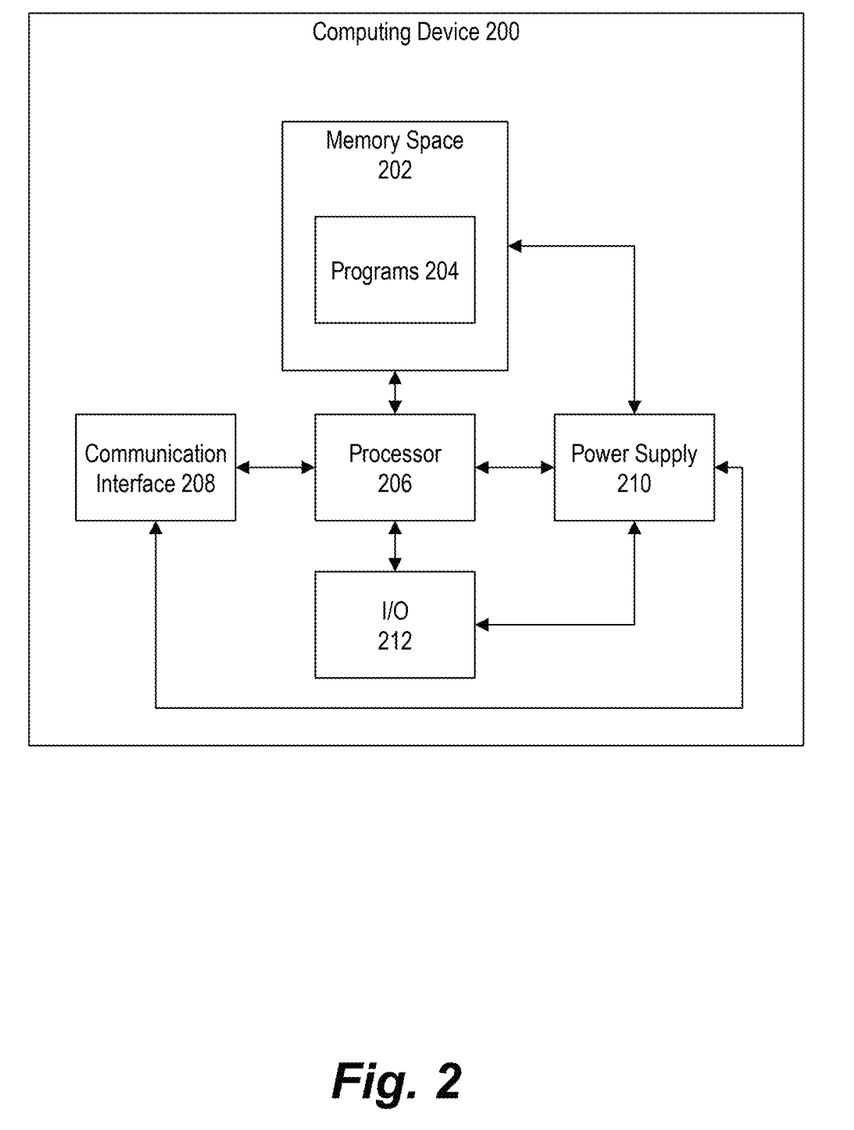
FIG. 2 illustrates an exemplary pictographic representation of a computing device, consistent with embodiments of the present disclosure.

FIG. 2 illustrates an exemplary pictographic representation of computing device 200, which may be a computer, a server, a router, an IoT device, or a controller. In some embodiments, computing device 200 may be a virtual device. Computing device 200 may be configured (e.g., through programs 204) to perform a single function (e.g., transmitting information), or multiple functions (e.g., receiving information, determining information to transmit, transmitting information, etc.). Computing device 200 may perform any number of steps (e.g., blocks) of the exemplary processes discussed herein, consistent with the disclosed exemplary embodiments.

Computing device 200 may include a memory space 202 and a processor 206. Memory space 202 may include a single memory component, or multiple memory components. Such memory components may include an electronic storage device, a magnetic storage device, an optical storage device, an electromagnetic storage device, a semiconductor storage device, or any suitable combination of the foregoing. For example, memory space 202 may include any number of hard disks, solid state memories, random access memories (RAMs), read-only memories (ROMs), erasable programmable read-only memories (EPROMs or Flash memories), and the like. Memory space 202 may include one or more storage devices configured to store instructions usable by processor 206 to perform functions related to the disclosed embodiments. For example, memory space 202 may be configured with one or more software instructions, such as software program(s) 204 or code segments that perform one or more operations when executed by processor 206 (e.g., the operations discussed in connection with figures below). The disclosed embodiments are not limited to separate programs or computers configured to perform dedicated tasks. For example, memory space 202 may include a single program or multiple programs that perform the functions associated with network architecture 100. Memory space 202 may also store data that is used by one or more software programs (e.g., data relating to application functions, data obtained during operation of the application, or other data).

In certain embodiments, memory space 202 may store software executable by processor 206 to perform one or more methods, such as the methods discussed herein. The software may be implemented via a variety of programming techniques and languages, such as C or MISRA-C, C+, C++, Java, Go, ASCET, Simulink, Stateflow, Python, and various others. Further, it should be emphasized that techniques disclosed herein are not limited to peer network embodiments. Various other environments may use the disclosed techniques, such as smart home appliances, network security or surveillance equipment, smart utility meters, connected sensor devices, parking garage sensors, and many more. In such embodiments, memory space 202 may store software that is based on a variety of programming techniques and languages such as C, C+, C++, C#, PHP, Java, JavaScript, Python, and various others.

Processor 206 may include one or more dedicated processing units, application-specific integrated circuits (ASICs), field-programmable gate arrays (FPGAs), graphical processing units, or various other types of processors or processing units coupled with memory space 202.

Computing device 200 may also include a communication interface 208, which may allow for remote devices to interact with other computing devices. Communication interface 208 may include an antenna or wired connection to allow for communication to or from computing device 200. For example, an external device (e.g., another computing device 200) may send code to computing device 200 instructing computing device 200 to perform certain operations, such as validating a request, identifying peer nodes, processing a request, accessing data, transmitting data, identifying a data source, etc.

Computing device 200 may also include power supply 210, which may be an AC/DC converter, DC/DC converter, regulator, or battery internal to a physical housing of computing device 200, and which may provide electrical power to computing device 200 to allow its components to function. In some embodiments, a power supply 210 may exist external to a physical housing of a computing device (i.e., may not be included as part of computing device 200 itself, such as when computing device 200 is connected to a power receptacle), and may supply electrical power to multiple computing devices.

Computing device 200 may also include input/output device (I/O) 212, which may be configured to allow for a user or device to interact with computing device 200. For example, I/O 212 may include at least one of wired and/or wireless network cards/chip sets (e.g., WiFi-based, cellular based, etc.), an antenna, a display (e.g., graphical display, textual display, etc.), an LED, a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps (e.g., blocks) of the methods of the disclosed embodiments, as discussed further below. It is appreciated that any entity in network architecture 100 may be or include a computing device 200.

FIG. 3 is a flowchart of an example process 300 for dynamically establishing peer network connectivity. In accordance with disclosed embodiments, process 300 may be implemented in network architecture 100 depicted in FIG. 1, or various other types of network environments. For example, process 300 may be performed by at least one processor (e.g., processor 206), memory (e.g., within memory space 202), and/or other components of at least one computing device 200, or by any computing device or IoT system. Additionally, process 300 may be performable by connection manager 102. Although FIG. 3 shows example blocks (e.g., operations, steps) of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

As shown in FIG. 3, process 300 may include establishing an initial connection with a client device (represented by block 302), such as client 104. Establishing the initial connection may include receiving an electronic communication (e.g., digital communication) from the client device, determining connection parameters to use for connecting with the client device, and/or transmitting an electronic communication to the client device. An electronic communication may include, without limitation, a communication that uses an Internet Protocol (IP), such as IPv4 and IPV6. Additionally or alternatively, other protocols may be used, such as IPsec, Distance Vector Multicast Routing Protocol (DVMRP), Internet Control Message Protocol (ICMP), Internet Group Management Protocol (IGMP), or any network level (i.e., the third level of the Open System Interconnection, or OSI, model) protocol. An electronic communication may include, without limitation, a communication that uses Transmission Control Protocol (TCP), User Datagram Protocol (UDP), or any transport level (i.e., the fourth level of the Open System Interconnection, or OSI, model) protocol. For example, an electronic communication, including any or all of the communications discussed below, may be a TCP/IP communication.

In some embodiments, the initial connection may be established based on authentication information from the software library. Additionally or alternatively, the authentication information may be from another source, such as local storage of connection manager 102. Authentication information may include at least one device identifier (e.g., an IP address, a user or customer identifier, a Media Access Control, or MAC, address), at least one cryptographic key, at least one access key, at least one port number, a user identifier, an account identifier, and/or any digital information usable to confirm the client device and/or a connection manager as a legitimate or authorized entity.

As shown in FIG. 3, process 300 may include receiving a peer-connection request including at least one peer node parameter (represented by block 304). The peer-connection request may be received from the client device and/or across the initial connection. A peer-connection request may be an electronic communication made by a device (e.g., the client device) to request the establishing of a connection between that device and at least one peer node. The peer-connection request may include digital information interpretable and usable by a device (e.g., a connection manager) to establish one or more connections between the client device and one or more peer nodes. For example, the peer-connection request may include at least one peer node parameter, which may include at least one of a port number, a geographical area, a device type, an operating system (OS), a number of peer nodes (e.g., a minimum number to use, a maximum number to use, a preferred number to use), a connection timeframe (e.g., a target timeframe for connection initiation and/or disconnection, a time to live, etc.), a bandwidth, a latency, an amount of packet loss, a protocol, a number of hops, or any constraint for establishing a connection between the client device and at least one peer node. In some embodiments, the peer-connection request may include multiple peer node parameters.

In some embodiments, when the peer-connection request is received, the client device may lack information identifying peer nodes, such as a subset of peer nodes, which may be a subset to which the client device is eventually connected. Additionally or alternatively, wherein the client device may lack information identifying peer nodes, such as a subset of peer nodes, when the peer-connection request is configured. Information identifying peer nodes may include at least one device identifier (e.g., an IP address, a user or customer identifier, a Media Access Control, or MAC, address), at least one cryptographic key, at least one access key, at least one port number, TCP/IP information, and/or any digital information usable to identify a peer node, connect with a peer node, and/or distinguish between peer nodes. In some embodiments, the peer-connection request may be received without peer connection information. For example, a connection manager may receive a peer-connection request from a client device (e.g., which does not include peer connection information) and may access peer connection information from another source (e.g., the peer nodes themselves, a data structure, and/or another device, etc.). The peer connection information may include, for example, Internet Protocol (IP) addresses of the subset of peer nodes, an operational status (e.g., online) of the subset of peer nodes, a port number, a peer node parameter, or any other information for constructing electronic communications to transmit to a peer node according to a known format.

In some embodiments, the peer-connection request may be configured by the client device using a software library. Configuring the peer-connection request using a software library may include detecting a user interaction (e.g., parameter selection, configuration setting, etc.) with the software library, extracting connection parameters from the software library, prompting the client device from input to the software library or information from the software library, or accessing the software library to determine information to include in the peer-connection request. In some embodiments, the at least one peer node parameter may be set or influenced by the client device using the software library. For example, the client device may define a geographical area within which it will connect to peer nodes. Additionally or alternatively, the client device may define one or more port numbers to use for connections between it and a peer node. Of course, any combination of the peer node parameters discussed above may be defined, determined, or influenced by the client device, such as based on user interactions with the software library. In some embodiments, the peer-connection request may include at least one peer node parameter that is configured by the client device and/or at least one peer node parameter that is not configured by the client device.

In some embodiments, the peer-connection request may be triggered by an access intention action initiated by the client device. Triggering the peer-connection request may include detecting the access intention action and initiating, configuring, and/or transmitting the peer-connection request in response to detecting the access intention action. An access intention action may include an action taken by a client device indicating an intent to access endpoint data, which may include information that is stored separately from the client device (e.g., at a remote database, web server, etc.). For example, a user of a client device may interact with a webpage or other interface to remote information, which may prompt a web browser, browser extension, or other application or program (e.g., running in the background in a manner not visible to a user) on the client device to formulate a request for information that is stored elsewhere from the client. Endpoint data may include any digital information stored at one or more devices separate from the client device, including a device accessible to the client device across a WAN. For example, endpoint data may include one or more of a webpage, an image, a digital document, a digital file, an application, a program, and/or a data structure.

Additionally or alternatively, the peer-connection request may be triggered by a request for a proxy protocol initiated by the client device. For example, a user may interact with the client device (e.g., at an application) to request the use of a proxy protocol for fulfilling one or more goals (e.g., downloading information).

As shown in FIG. 3, process 300 may include determining, from among peer nodes, a subset of the peer nodes satisfying the at least one peer node parameter (represented by block 306). Determining the subset of peer nodes may include identifying certain peer nodes that, if connected to the client device, will satisfy the at least one peer node parameter. For example, if the at least one peer node parameter includes an IP address range, determining the subset of peer nodes may include identifying which peer nodes among the peer nodes have an IP address in the IP address range. As another non-exclusive example, if the at least one peer node parameter includes a geographic area, determining the subset of peer nodes may include identifying which peer nodes among the peer nodes are located in the geographic area (e.g., by examining their IP address information). As another non-exclusive example, if the at least one peer node parameter includes a data transfer speed of at least 1 gigabit per second (1 Gbps), determining the subset of peer nodes may include identifying which peer nodes among the peer nodes are currently transferring, or have the capability to transfer, data at a speed of at least 1 Gbps. As another non-exclusive example, if the at least one peer node parameter includes a minimum of IPV6, determining the subset of peer nodes may include identifying which peer nodes among the peer nodes are currently operating using, or have the capability to operate using, IPv6.

In some embodiments, determining the subset of the peer nodes satisfying the at least one peer node parameter may include determining a subgroup of the peer nodes satisfying the at least one peer node parameter and then, after determining the subgroup, determining, from among the subgroup of peer nodes, the subset of peer nodes based on at least one performance parameter set by a connection management device. A performance parameter may include any processing, storage, or electronic communication information related to peer nodes, such as a total potential bandwidth, an available bandwidth, an amount of packet loss, a number of potential connections, a number of used and/or available connections, a number of total usable ports, a number of used and/or available ports, a latency, a processing load, an electronic communication interface load, a memory load, or any information indicating a current or historical usage of at least one peer node. By way illustrative example, a connection manager may determine that 5,000 peer nodes among 100,000 available (e.g., known, connectable, and/or below capacity) peer nodes satisfy the at least one peer node parameter, and then may determine that 300 of the 5,000 peer nodes have available bandwidth above a threshold (a performance parameter) and should therefore be prioritized for connecting to a client device.

In some embodiments, a performance parameter may be client-specific (e.g., associated with a specific client device by a connection manager). For example, process 300 may include determining an identifier (e.g., user or account identifier) associated with (e.g., a sender or source of) a peer-connection request and determining one or more performance parameters associated with the identifier, to use to determine the subset of peer nodes.

As shown in FIG. 3, process 300 may include an operation 308 of transmitting, to the subset of peer nodes, a connection generation communication to trigger establishment of a client-peer connection between at least one recipient peer node and the client device. A connection generation communication may include an electronic communication configured to prompt or cause a peer node to request and/or establish a connection with a client device. For example, the connection generation communication may include a request that a peer device connect with a particular client device, and may include client device connection information for establishing the client-peer connection. Client device connection information may include information for establishing and/or configuring a connection between the client device and a peer node, such as information identifying the client device (e.g., an IP address), endpoint data, and/or any parameter defining a way in which to connect with the client device (e.g., a connection start time, a connection end time, a connection duration length, a time to live, or any peer node parameter). For example, the connection generation communication includes a time to live (TTL) for the client-peer connection, which may be based on the at least one peer node parameter. Additionally or alternatively, the client device connection information may include a security key usable by one or more of the subset of peer nodes to authenticate itself to the client device.

In some embodiments, transmitting the connection generation communication to the subset of peer nodes may include transmitting multiple connection generation communications to multiple respective recipient peer nodes. Each connection generation communication may include information for establishing a respective client-peer connection. For example, each connection generation communication may include any of the connection information discussed above (e.g., in the preceding paragraph). Additionally, each connection generation communication may include unique connection information that is specific to a particular recipient peer node. In some embodiments, multiple connection generation communications may be transmitted simultaneously (e.g., by a connection manager).

In some embodiments, process 300 may also include blocks for determining and/or maintaining connection availability information associated with peer nodes. For example, process 300 may include receiving connection availability information repeatedly (e.g., periodically, regularly, upon repeated requests) from at least some of the peer nodes. Connection availability information may include information identifying a peer node and/or networking context of the peer node. Networking context may include, for example, an uptime of the peer node, a downtime of the peer node, an online/offline status of the peer node, at least one performance parameter of the peer node (discussed further above), a geographic location of the peer node, a network location of the peer node (e.g., an IP address, a subnet identifier, etc.), or any indicator of a peer node's networking capability, which may be expressed as a capability relative to serving a client device request. Process 300 may use the connection availability information to determine a subgroup and/or subset of peer nodes, consistent with disclosed embodiments. For example, the connection availability information may overlap with at least one peer node parameter and/or performance parameter, and process 300 may compare the connection availability information to that parameter or parameters to determine to which peer nodes to transmit the connection generation communication(s).

Process 300 may also include generating and/or updating a connection information map of the peer nodes based on the connection availability information. Process 300 may update the connection information map as information is received from peer nodes. As discussed above, process 300 may include receiving connection availability information repeatedly from one or more peer nodes. This may occur based on a push arrangement, where the peer nodes are configured to repeatedly transmit (e.g., to a connection manager) their respective connection availability information irrespective of receiving any request for such information, and/or pull function, where the peer nodes are configured to repeatedly transmit (e.g., to a connection manager) their respective connection availability information based on receiving a request for such information (e.g., from the connection manager). Process 300 may include receiving initial and/or updated connection availability information from large numbers of peer nodes, such as thousands, tens of thousands, or even millions of peer nodes or more, and this information may be used to update the connection information map at a high frequency, for example, such as once every second or less, once every 10 seconds or less, once every 30 seconds, once every minute, or even once every half-hour or hour. For example, the peer nodes (from which connection availability information is received) may include at least thousands of peer nodes.

In some embodiments, the connection availability information is determined (e.g., by the connection manager) in association with the peer-connection request, the subset of peer nodes, and the connection generation communication. For example, the connection manager may determine (e.g., receive, store, use for generating or updating a map, etc.) connection availability information simultaneously or near-simultaneously (e.g., within the same minute) with performing any or all of blocks 302, 304, 306, and 308.

In some embodiments, after or based on the transmission of the connection generation communication, the subset of peer nodes may establish a client-peer connection with the client device, for example as discussed above. In some embodiments, multiple client-peer connections may be established with the client device, with each client-peer connection being associated with (e.g., connected to, established by, etc.) a different peer node. The subset of peer nodes may be configured to transmit the endpoint data to the client device across the client-peer connection (or multiple client-peer connections, as the case may be). Additionally, the subset of peer nodes may establish at least one peer-target connection with a target data source having access to the endpoint data. For example, each peer node of the subset may establish a distinct connection with the target data source to facilitate access to the endpoint data. Additionally, the subset of peer nodes may receive the endpoint data from the target data source across the at least one peer-target connection. Additionally, the client device may receive the endpoint data from the subset of peer nodes across the client-peer connection, for example after the subset of peer nodes receives the endpoint data from the target data source.

Some embodiments may involve tracking electronic communication activity between devices. For example, process 300 may include tracking network traffic between the subset of peer nodes and the client device. Tracking network traffic may include inserting information into electronic communications, requesting network traffic information from one or more devices (e.g., a peer node, a client device), receiving network traffic information from one or more devices, downloading network traffic information, and/or determining a quantity, timing, and/or content of electronic information transmitted between devices (e.g., within network architecture 100). For example, tracking the network traffic between subset of peer nodes and the client device may include receiving network traffic information from the subset of peer nodes, such as a size of data sent, an amount of bandwidth used, or an amount of active connection time. Additionally or alternatively, tracking the network traffic between subset of peer nodes and the client device may include receiving network traffic information from the client device. In some embodiments, tracking the network traffic may include comparing information received from at least one peer node and the client device, to determine if the information matches (e.g., within a tolerance threshold).

Tracking electronic communication activity between devices may include using networking protocol information to identify devices and/or associate data transmissions with one or more particular devices. For example, process 300 may include associating an IP address of the client device with identification information uniquely identifying a client entity. Additionally, process 300 may include associating network traffic information associated with (e.g., listing, indicating, linked to, part of a same packet or message) the IP address with the identification information. Process 300 may include using the tracked electronic communication activity to influence or cause subsequent actions, such as limiting connections or other network resources to a client device (e.g., when a threshold of usage, potentially during a certain amount of time, is reached).

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways. Unless indicated otherwise, "based on" can include one of more of being dependent upon, being responsive to, being interdependent with, being influenced by, using information from, resulting from, or having a relationship with.

For example, while some embodiments are discussed in a context involving a client or server, this subject matter need not be present in each embodiment, as other devices (e.g., applications, instances, embedded devices, etc.) may also operate within the disclosed embodiments. Such variations are fully within the scope and spirit of the described embodiments.

The disclosed embodiments may be implemented in a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for dynamically establishing peer network connectivity, comprising:
    establishing an initial connection with a client device;
    receiving, from the client device and across the initial connection, a peer-connection request including at least one peer node parameter;
    determining, from among peer nodes, a subset of the peer nodes satisfying the at least one peer node parameter; and
    transmitting, to the subset of peer nodes, connection generation communications to trigger establishment of respective client-peer connections between at least a portion of the subset of peer nodes and the client device, the connection generation communications each comprising client device connection information for establishing the respective client-peer connection, wherein:
        the subset of peer nodes establish at least one peer-target connection with a target data source having access to endpoint data for which the client device initiated an access intention action; or
        the client device connection information comprises a security key usable by one of the subset of peer nodes to authenticate itself to the client device.

2. The computer-implemented method of claim 1, wherein:
    when the peer-connection request is received, the client device lacks information identifying the subset of peer nodes; and
    the peer-connection request is received without peer connection information.

3. The computer-implemented method of claim 1, further comprising:
    receiving connection availability information repeatedly from at least some of the peer nodes; and
    generating or updating a connection information map of the peer nodes based on the connection availability information.

4. The computer-implemented method of claim 3, wherein:
    the peer nodes comprise at least thousands of peer nodes; and
    the connection availability information is determined in association with the peer-connection request, the subset of peer nodes, and the connection generation communication.

5. The computer-implemented method of claim 1, wherein the peer-connection request is configured by the client device using a software library.

6. The computer-implemented method of claim 5, wherein the at least one peer node parameter is set by the client device using the software library.

7. The computer-implemented method of claim 5, wherein the client device lacks information identifying the subset of peer nodes when the peer-connection request is configured.

8. The computer-implemented method of claim 1, wherein:
    the peer-connection request is triggered by the access intention action initiated by the client device; and
    the access intention action comprises an indication of intent to access the endpoint data.

9. The computer-implemented method of claim 8, wherein the subset of peer nodes establish at least one peer-target connection with a target data source having access to the endpoint data.

10. The computer-implemented method of claim 9, wherein the subset of peer nodes receive the endpoint data from the target data source across the at least one peer-target connection.

11. The computer-implemented method of claim 10, wherein the client device receives the endpoint data from the subset of peer nodes across the client-peer connection after the subset of peer nodes receives the endpoint data from a target data source.

12. The computer-implemented method of claim 1, wherein the at least one peer node parameter comprises at least one of: a port number, a geographical area, a device type, an operating system (OS), a number of peers, a connection timeframe, or a bandwidth.

13. The computer-implemented method of claim 1, wherein determining the subset of peer nodes comprises:
    determining a subgroup of peer nodes satisfying the at least one peer node parameter; and
    after determining the subgroup, determining, from among the subgroup of peer nodes, the subset of peer nodes based on at least one performance parameter set by a connection management device.

14. The computer-implemented method of claim 1, wherein:
- the connection generation communication includes a time to live (TTL) for the client-peer connection; and
- the TTL for the client-peer connection is based on the at least one peer node parameter.

15. The computer-implemented method of claim 1, further comprising associating an IP address of the client device with identification information uniquely identifying a client entity.

16. The computer-implemented method of claim 1, further comprising tracking network traffic between subset of peer nodes and the client device.

17. The computer-implemented method of claim 16, wherein tracking the network traffic between subset of peer nodes and the client device comprises receiving network traffic information from the subset of peer nodes.

18. The computer-implemented method of claim 16, wherein tracking the network traffic between subset of peer nodes and the client device comprises receiving network traffic information from the client device.

19. A non-transitory computer-readable medium storing one or more instructions for dynamically establishing a peer network connectivity, that, when executed by one or more processors of a device, cause the device to:
- establishing an initial connection with a client device;
- receiving, from the client device and across the initial connection, a peer-connection request including at least one peer node parameter;
- determining, from among peer nodes, a subset of peer nodes satisfying the at least one peer node parameter; and
- transmitting, from a connection to the subset of peer nodes, connection generation communications to trigger establishment of respective client-peer connections between at least a portion of the subset of peer nodes and the client device, the connection generation communications each comprising client device connection information for establishing the respective client-peer connection, wherein:
  - the subset of peer nodes establish at least one peer-target connection with a target data source having access to endpoint data for which the client device initiated an access intention action; or
  - the client device connection information comprises a security key usable by one of the subset of peer nodes to authenticate itself to the client device.

20. The non-transitory computer-readable medium of claim 19, wherein the at least one peer node parameter comprises at least one of: a port number, a geographical area, a device type, an operating system (OS), a number of peers, a connection timeframe, or a bandwidth.

* * * * *